Dec. 18, 1928.　　　　　　　　　　　　　　　　1,696,042
G. H. KRISTEK
COTTON SEED LOADING DEVICE
Filed Nov. 5, 1927　　　3 Sheets-Sheet 1

George H. Kristek
INVENTOR
BY Victor J. Evans
ATTORNEY

WITNESS:

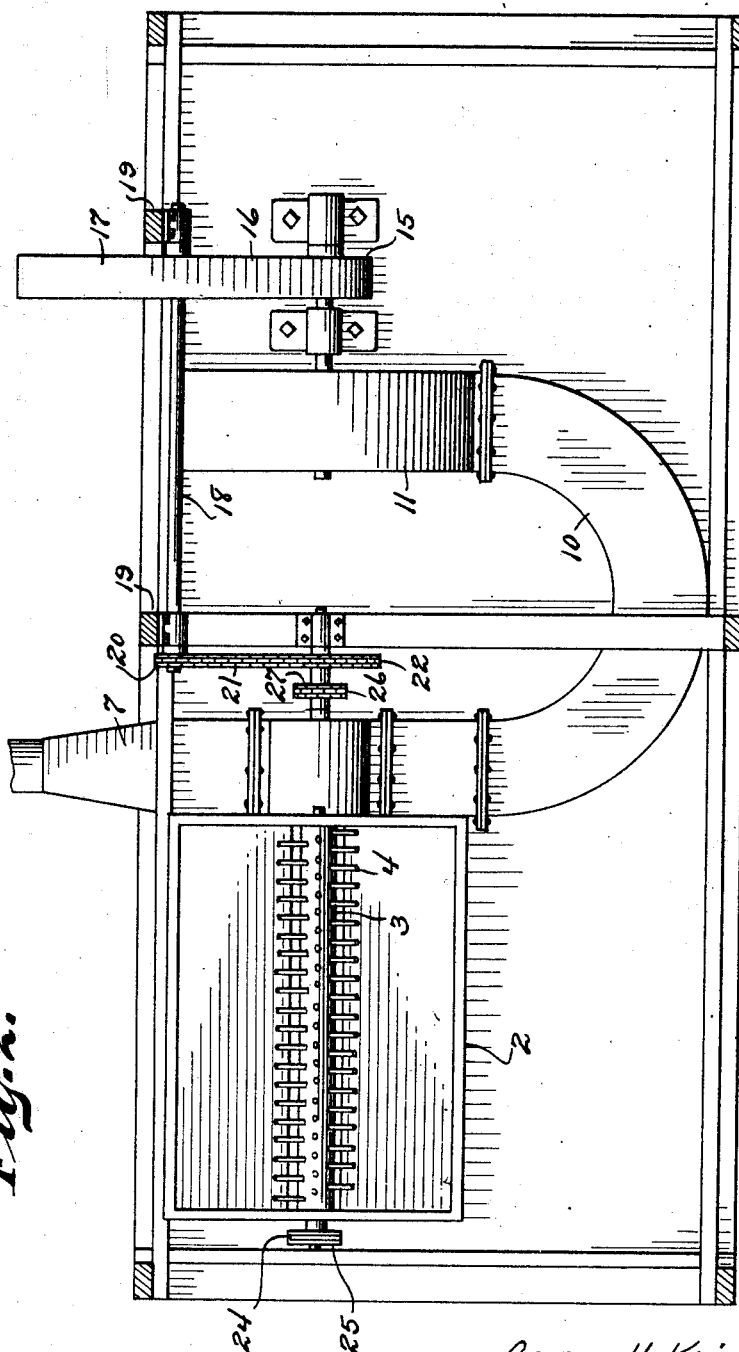

Dec. 18, 1928.  1,696,042

G. H. KRISTEK

COTTON SEED LOADING DEVICE

Filed Nov. 5, 1927   3 Sheets-Sheet 3

George H. Kristek
INVENTOR
BY Victor J. Evans
ATTORNEY

WITNESS:

Patented Dec. 18, 1928.

1,696,042

UNITED STATES PATENT OFFICE.

GEORGE H. KRISTEK, OF ELLINGER, TEXAS.

COTTONSEED-LOADING DEVICE.

Application filed November 5, 1927. Serial No. 231,318.

This invention relates to a cotton seed loader, the general object of the invention being to provide a machine for receiving the cotton seed from wagons, trucks or the like and conveying it to a distant point, such as a box car or a packing house, with but little effort and expense.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a section on line 2—2 of Figure 1.

Figure 1:
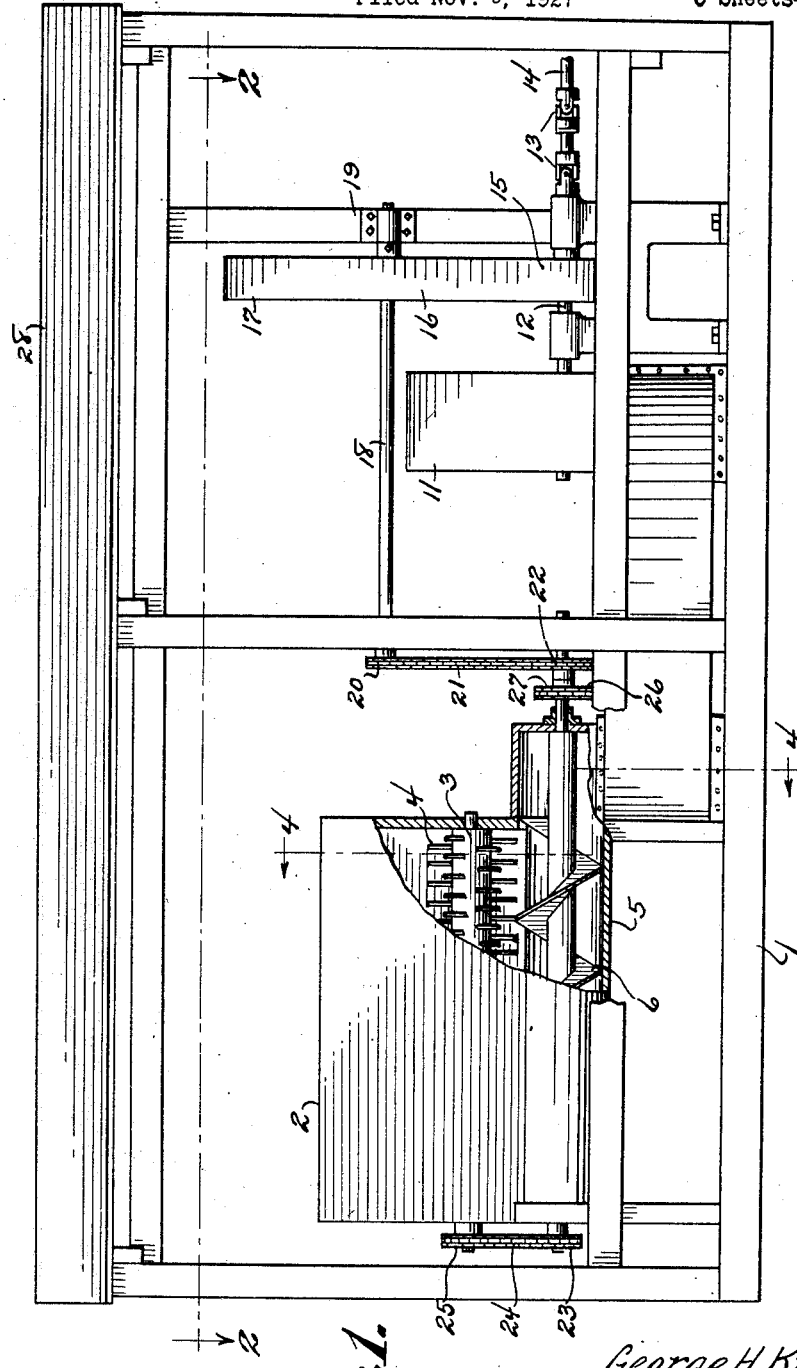
Figure 1 is an elevation with parts broken away.
Figure 4:
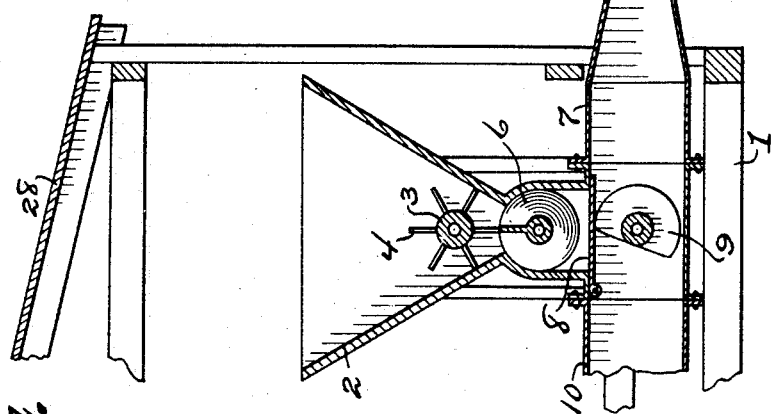
Figure 4 is a section on line 4—4 of Figure 1.
Figure 3:
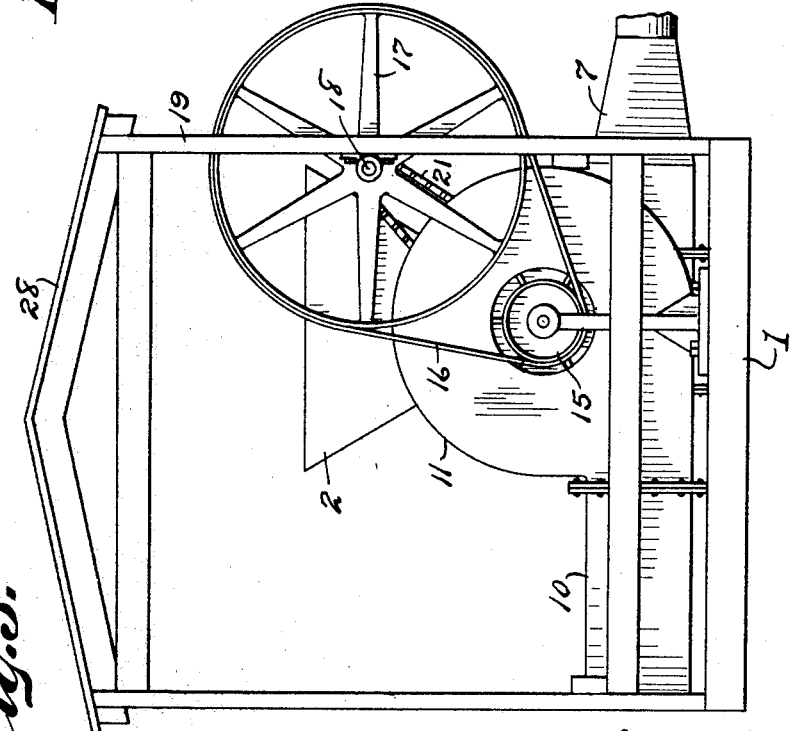
Figure 3 is an end view.

In these views, 1 indicates a foundation and 2 indicates a hopper which is supported above the foundation adjacent one side and one end thereof, as shown in Figure 2, so that cotton seed may be dumped into the hopper from wagons backed up against the foundation. A roller 3 is arranged in the narrow part of the hopper and carries the pins 4, this roller and its pins acting as an agitator for the seeds in the hopper. A conveyor casing 5 is arranged below the hopper for receiving the seeds therefrom and a spiral conveyor 6 is arranged in said conveyor casing. A discharge spout 7 is arranged under the projecting end of the casing 5 and a gate 8 controls the flow of material from the conveyor casing into this discharge chute. The gate is actuated by the cam member 9.

The discharge chute 7 is connected by a curved trunk 10 with the exhaust outlet of a fan 11 supported on the base and whose shaft 12 is connected by the flexible joints 13 with a power shaft 14. The shaft 12 carries a pulley 15 over which passes a belt 16 which in turn passes over a large pulley 17 fastened to a shaft 18 carried by the uprights 19 on the foundation and the other end of this shaft carries a sprocket 20 over which passes a chain 21 which also passes over a sprocket 22 on the extended end of the conveyor shaft and the other end of the conveyor shaft carries a sprocket 23 over which passes a chain 24 which also passes over a sprocket 25 which is fastened to a pintle of the roller 3. An endless chain 26 passes over a sprocket 27 on the front end of the conveyor shaft and it also passes over a sprocket on the shaft of the cam 9 for operating the same so as to cause the cam member to open and close the gate. The entire device may be provided with a roof 28 to protect the parts from the elements and curtains may be placed at the sides of the uprights, if desired.

From the foregoing it will be seen that when the seed is dumped into the hopper, it will be caught by the agitators and carried to the conveyor casing where the screw conveyor will force it to the gate end of the casing. Here the cam operated gate will regulate the passage of the seeds into the discharge spout and as the seeds fall into the discharge spout, they are subjected to the air blast from the fan which forces them through the spout to the discharge point. As will be seen, the spout is so formed as to increase the pressure of the blast so that the seeds will be thrown farther.

This device will economize on labor and is useful for loading cotton seed from trucks or wagons into box cars when shipping the seed from a cotton gin to an oil mill and it can also be used in loading cotton seed into storage houses without necessitating the starting up of the power plant of the cotton mills to feed the seed into the storage house. The machine can be made portable, when desired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A loading device comprising a hopper, a conveyor casing below the same and in communication therewith, an agitator in the hopper, a conveyor in the casing, a discharge spout below the discharge end of the casing, a fan, a trunk connecting the fan with the discharge spout, means for intermittently permitting the material to pass from the conveyor into the discharge spout, such means comprising a downwardly opening gate, a cam member for opening and closing the same and means for operating the cam member from the conveyor.

In testimony whereof I affix my signature.

GEORGE H. KRISTEK.